(12) United States Patent
Floyd (10) Patent No.: US 10,183,869 B2
(45) Date of Patent: Jan. 22, 2019

(54) WATER FILTERING DEVICE (71) Applicant: William Floyd, Monticello, FL (US)

(72) Inventor: William Floyd, Monticello, FL (US)

( * ) Notice: Subject to any disclaimer, the term of this patent is extended or adjusted under 35 U.S.C. 154(b) by 0 days.

(21) Appl. No.: 14/623,666

(22) Filed: Feb. 17, 2015

(65) Prior Publication Data

US 2016/0236945 A1    Aug. 18, 2016

(51) Int. Cl.
| | |
|---|---|
| *C02F 1/00* | (2006.01) |
| *C02F 1/467* | (2006.01) |
| *B01D 35/153* | (2006.01) |
| *C02F 1/28* | (2006.01) |
| *B01D 35/04* | (2006.01) |

(52) U.S. Cl.
CPC ............. *C02F 1/003* (2013.01); *C02F 1/283* (2013.01); *C02F 2201/005* (2013.01); *C02F 2209/40* (2013.01); *C02F 2307/06* (2013.01)

(58) Field of Classification Search
USPC ......................................................... 210/110
See application file for complete search history.

(56) References Cited

U.S. PATENT DOCUMENTS

| | | | | | |
|---|---|---|---|---|---|
| 4,933,080 | A | * | 6/1990 | Rundzaitis | ........... B01D 35/043 210/232 |
| 5,062,164 | A | * | 11/1991 | Lee | ......................... E03C 1/057 137/613 |
| 5,152,464 | A | * | 10/1992 | Farley | ....................... B05B 1/14 210/449 |
| 5,192,427 | A | * | 3/1993 | Eger | ....................... E03C 1/046 210/133 |
| 6,016,977 | A | * | 1/2000 | Farley | ................... B05B 15/002 239/525 |
| 8,268,168 | B2 | * | 9/2012 | Mang | ...................... C02F 1/003 210/137 |
| 2009/0272449 | A1 | * | 11/2009 | Craig | ..................... B01F 5/0496 137/897 |
| 2010/0084492 | A1 | * | 4/2010 | Gautschi | ............... B05B 1/1681 239/525 |

* cited by examiner

*Primary Examiner* — Heidi R Kelley
*Assistant Examiner* — Akash K Varma
(74) *Attorney, Agent, or Firm* — J. Wiley Horton (57) ABSTRACT

A filtering system intended to be attached to the water tap in a shower. The system preferably uses two distinct filtering media in order to filter water—charcoal and kinetic degradation fluxion ("KDF") media. The present invention preferably includes a bypass valve which allows the user to properly gauge and adjust the temperature of the water prior to passing the water through the filter. The present invention preferably includes two check valves as well. One such check valve is located at the filter entrance, and the other check valve is located at the filter exit. While the shower is activated, the pressure from the water forces each valve open. However, when the shower is not activated, each valve automatically closes (the valves are normally closed valves). The check valve system allows the KDF media to remain in a saturated state, which increases the efficacy and lifespan of the filtering media.

19 Claims, 14 Drawing Sheets

WATER FILTERING DEVICE

BACKGROUND OF THE INVENTION

1. Field of the Invention

This invention relates to the field of water filters. More specifically, the invention comprises a water filter intended for use in a shower that maintains the filtering media of the filter in a saturated state.

2. Description of the Related Art

The water used in many developed countries is typically treated with a disinfecting agent. This eliminates bacteria and other harmful pathogens contained in the water. By disinfecting the water, the likelihood of illness due to these pathogens in the water is greatly reduced—to such a degree that the water is safe to drink without further processing by the consumer. This water is then distributed to buildings, houses, restaurants, and any other structure that requires clean water.

Although disinfecting the water is necessary to avoid illness, it may cause undesirable side effects. Typically, chlorine or chloramine is used to disinfect the water (destroying harmful pathogens in the water). In addition to disinfecting the water, chlorine also oxidizes certain compounds that form taste or odor. However, the chlorine reacts with organic matter in the water as well, which creates disinfection by-products, or "DBPs." One of the most prevalent DBPs is trihalomethanes ("TMHs"). TMHs are cancer 2B carcinogens (possibly carcinogenic to humans), and TMHs are linked to reproduction issues in humans who have had a significant amount of exposure. Individuals exposed to TMHs in small amounts can experience a weakened immune system, disruption of the central nervous system, damage to the cardiovascular system, disruption of the renal system, and respiratory problems.

Oftentimes individuals install water filters in the workplace or home. These filters can be installed outside of the home such that the water coming into the home is filtered before entering the home. However, in many cases user's only install filters for drinking water. Although this is helpful in reducing the user's consumption of DBPs, it does not eliminate the main source of exposure to DBPs. In fact, taking a shower is typically the main source of exposure to DBPs for an individual. This is due to the duration of a shower, the vaporization due to increased temperature while typically taking a shower, and the surface area affected (lungs and skin) while taking a shower. Consequently, installing a shower filter decreases the chlorine content of the water and decreases the user's exposure to DBPs.

Thus, some inventors have explored fabricating a water filter intended for use in the shower. One such example is found in U.S. Pat. No. 4,933,080 to Rundzaitis et al. (1990). The invention disclosed by Rundzaitis et al. provides a filter with a valve that allows the user to bypass the filter. Similarly, U.S. Pat. No. 5,192,427 to Eger et al. discloses a filter which also acts as a cosmetic holder or container.

All the devices provide a water filtering system for a shower. However, they fail to maintain the filter media in a wetted state even while the user is not using the shower. A shower represents an unusual installation for a filter in that water is not typically maintained in the line leading to the shower head when the shower head is not in use. Most shower heads are installed in conjunction with a bath spigot. A two-way valve in the vicinity of the spigot directs water either to the spigot or up through a vertical line leading to the shower head.

Once the valves leading to the spigot/shower head are turned off, the two-way valve in the spigot typically opens and allows the water in the vertical line to drain out through the spigot. Thus, when not in use, the line leading to the shower head does not contain water. If a water filter is installed in this line, it will be drained as the line itself is drained. Unfortunately, the filter media used in water filters degrades significantly if it is not maintained in a wet state. The present invention solves this and other problems, as will be described more particularly in the following text.

BRIEF SUMMARY OF THE INVENTION

The present invention comprises a filtering system intended to be attached to the water tap in a shower. The system preferably uses two distinct filtering media in order to filter water—charcoal and kinetic degradation fluxion ("KDF") media. In addition to a filtering system, the present invention preferably includes a bypass valve which allows the user to properly gauge and adjust the temperature of the water prior to passing the water through the filter.

The present invention also maintains the filter media in a wetted state when the shower is not in use. A preferred embodiment employs two check valves for this purpose. One such check valve is located at the water inlet of the filter and the other check valve is located at the water exit of the filter. While water is flowing to the filter, the pressure from the water forces each valve open. However, when the shower is not flowing to the filter, each valve automatically closes (the valves are normally closed valves). The check valve system allows the KDF media to remain in a saturated state, which increases the efficacy and lifespan of the filtering media.

REFERENCE NUMERALS IN THE DRAWINGS 10 shower
12 water tap
14 shower head
16 water filter
18 bypass valve
19 filter outlet
20 filter inlet
22 tap connection
24 bypass valve outlet
25 valve knob
26 main body housing
28 water treatment module
30 housing cap
32 inlet check valve
34 redirection conduit
36 air expansion chamber
37 linking conduit
38 media exclusion screen
40 filtering media chamber
41 kinetic degradation fluxion media
42 water treatment outlet
44 outlet check valve
46 filtering housing mount
48 compression spring
50 ball
52 valve cap
54 central hole
56 centering ribs
58 valve opening
60 attachment surface
62 opening
64 notch
66 air pocket
68 water level
70 charcoal
72 filling cap

DETAILED DESCRIPTION OF THE INVENTION

Figure 1:
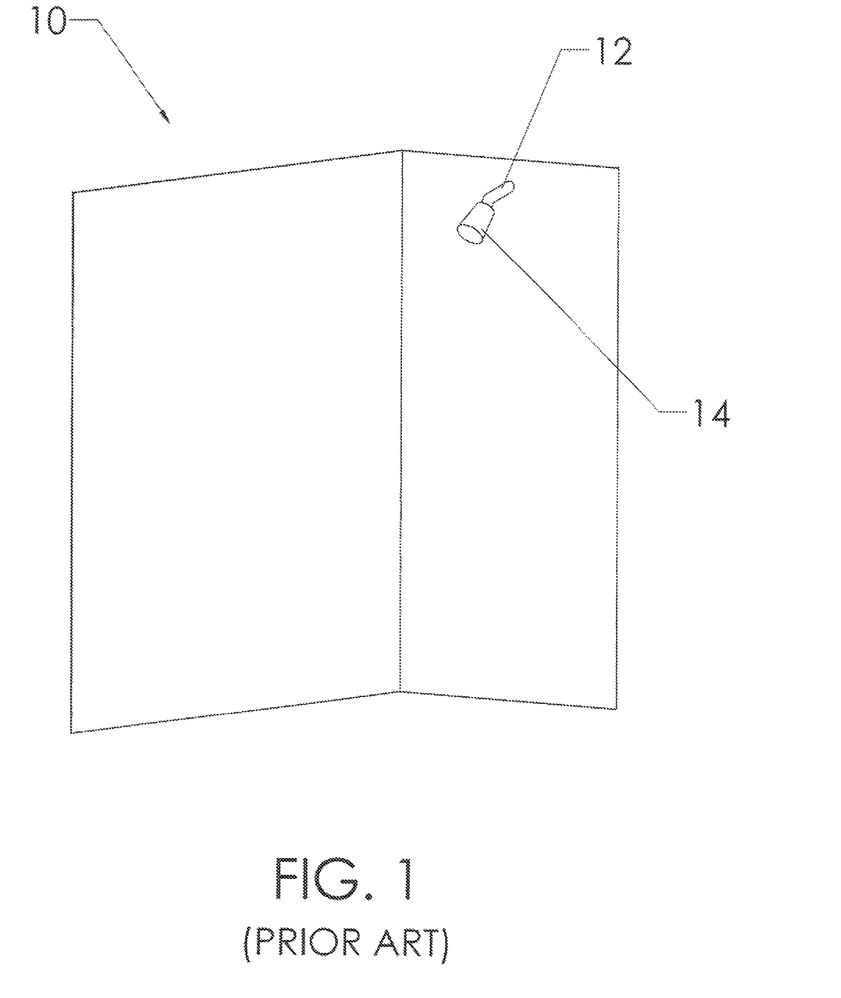
FIG. 1 is perspective view, showing a prior art shower.
Figure 2:
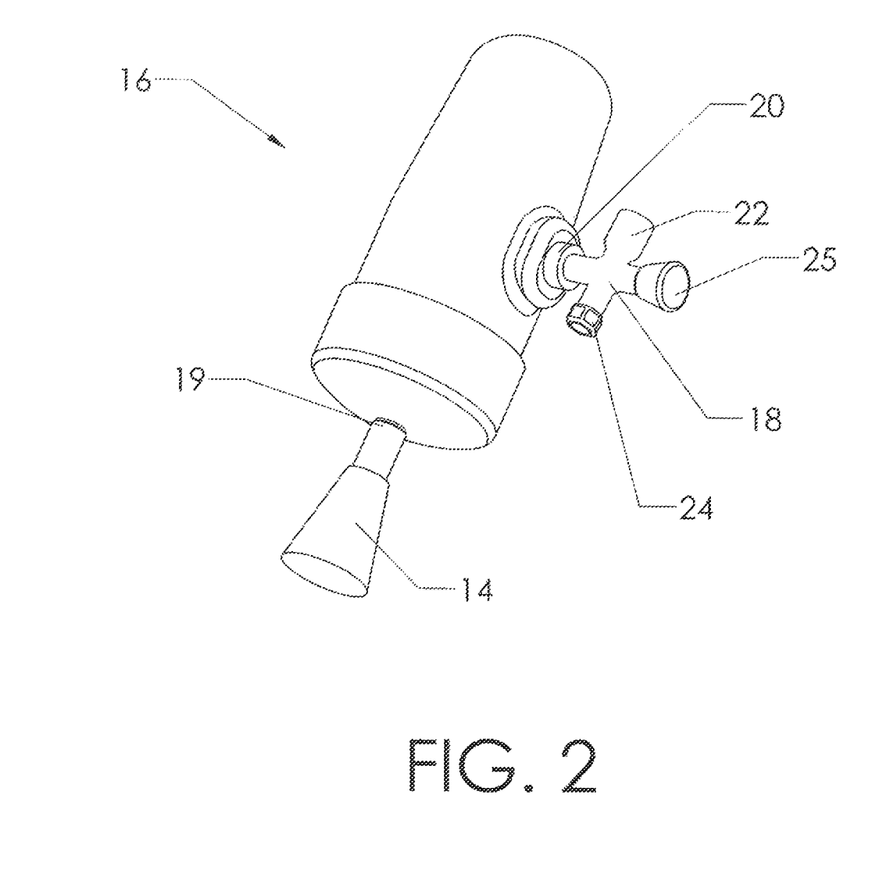
FIG. 2 is a perspective view, showing a preferred embodiment of the present invention.

The present invention provides a filtering device intended to be used in a shower, although it certainly could be installed in other applications as well. Briefly, FIG. 1 shows a prior art shower 10, which includes water tap 12 and showerhead 14. A preferred embodiment of the present invention is shown in FIG. 2. Water filter 16 preferably includes filter inlet 20 and filter outlet 19. In order to install the device, showerhead 14 is removed from water tap 12 (this is typically a threaded connection) and attached to filter outlet 19. Bypass valve 18 is then attached to filter inlet 20. Bypass valve 18 includes tap connection 22, which is fastened to water tap 12. Those familiar with the art will note that there are many combinations of connections available to fasten each conduit/fitting to the accompanying fitting. For example, the connection can be an outer thread coupled to a tapped hole, an outer thread coupled to a sealed nut, or any other known coupling method in the art.

Preferably, bypass valve 18 also includes bypass valve outlet 24 and valve knob 25. Bypass valve 18 allows the user to bypass water filter 16 in order to accurately evaluate the water temperature coming from water tap 12 before the filter is engaged. In one position valve knob 25 channels water to bypass valve outlet 24. In the other position, valve knob 25 directs water to filter inlet 20. Due to the extended time necessary to properly filter the water issuing from tap 12, there could be a difference in temperature form the water issuing straight from tap 12 and the water issuing from water filter 16. Bypass valve 18 allows the user to more easily regulate the temperature due to the direct flow created with the valve. In addition, the temperature of the water may be difficult to determine through filter 16 due to the constantly wetted state of the filter. When the user turns on the shower, the initial water flowing from the shower head 14 will be cold water that had been resting in water filter 16 from the previous shower. Bypass valve 18 assists in limiting surprise and/or burning from the user due to water temperature.

Figure 3:
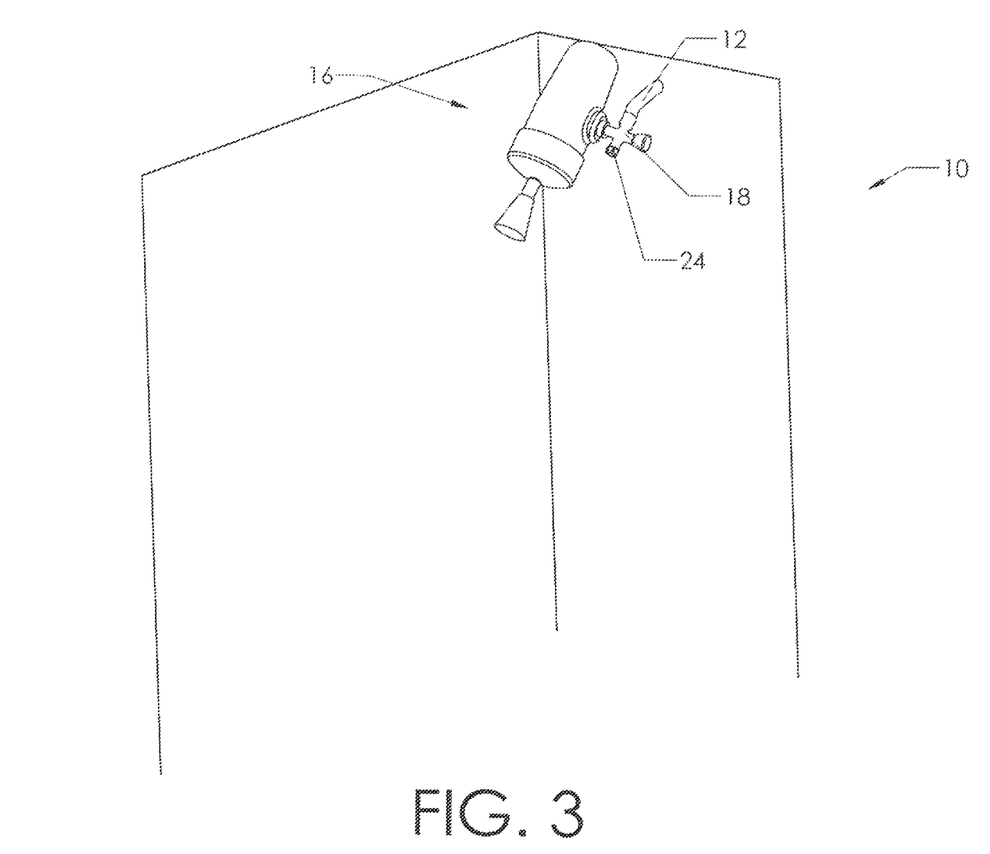
FIG. 3 is a perspective view, showing the present invention installed on a prior art shower.

FIG. 3 shows a preferred embodiment of the present invention installed in a prior art shower 10. As discussed in the previous description, bypass valve 18 is attached to water tap 12. Water flowing from water tap 12 enters bypass valve 18, then flows either out of bypass valve outlet 24 or into water filter 16. In a preferred embodiment of the present invention, water filter 16 is attached such that the centerline of the filter is angled between about 40 and 50 degrees from the horizontal plane. The relevance of this will be discussed further in the subsequent text.

Figure 4:
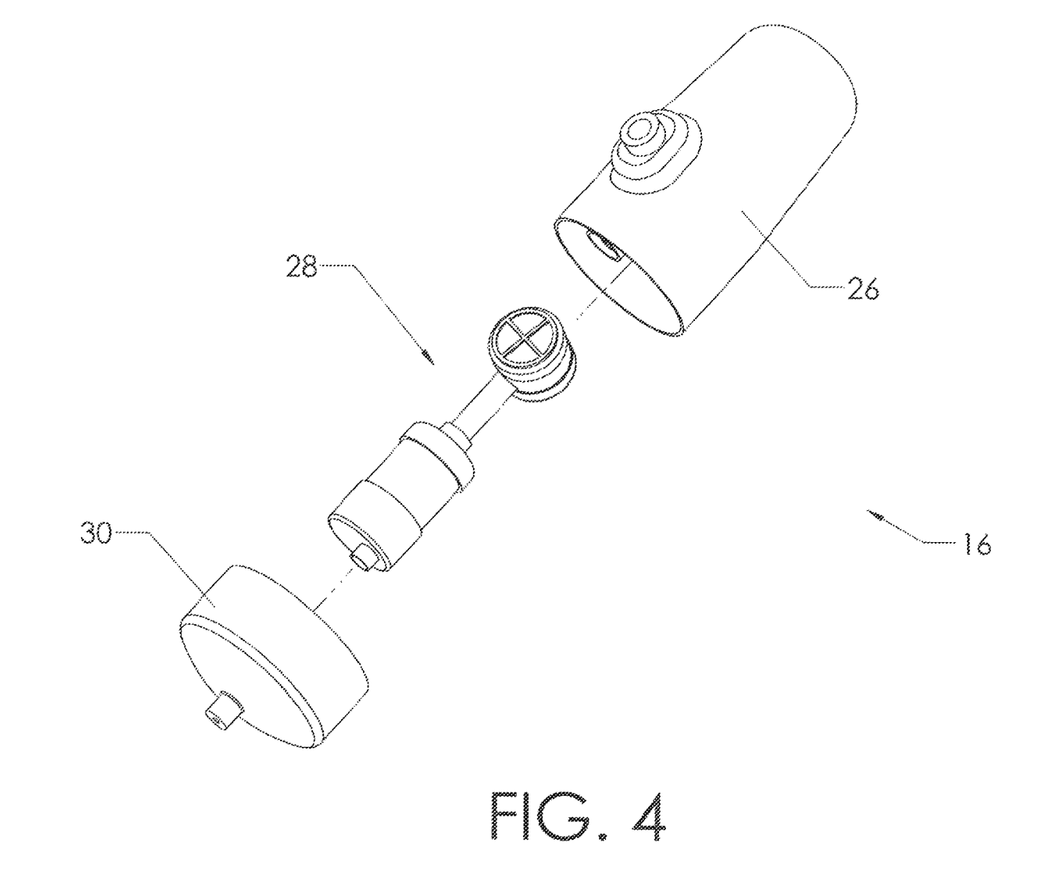
FIG. 4 is an exploded view, showing the primary components of the present invention.
Figure 6:
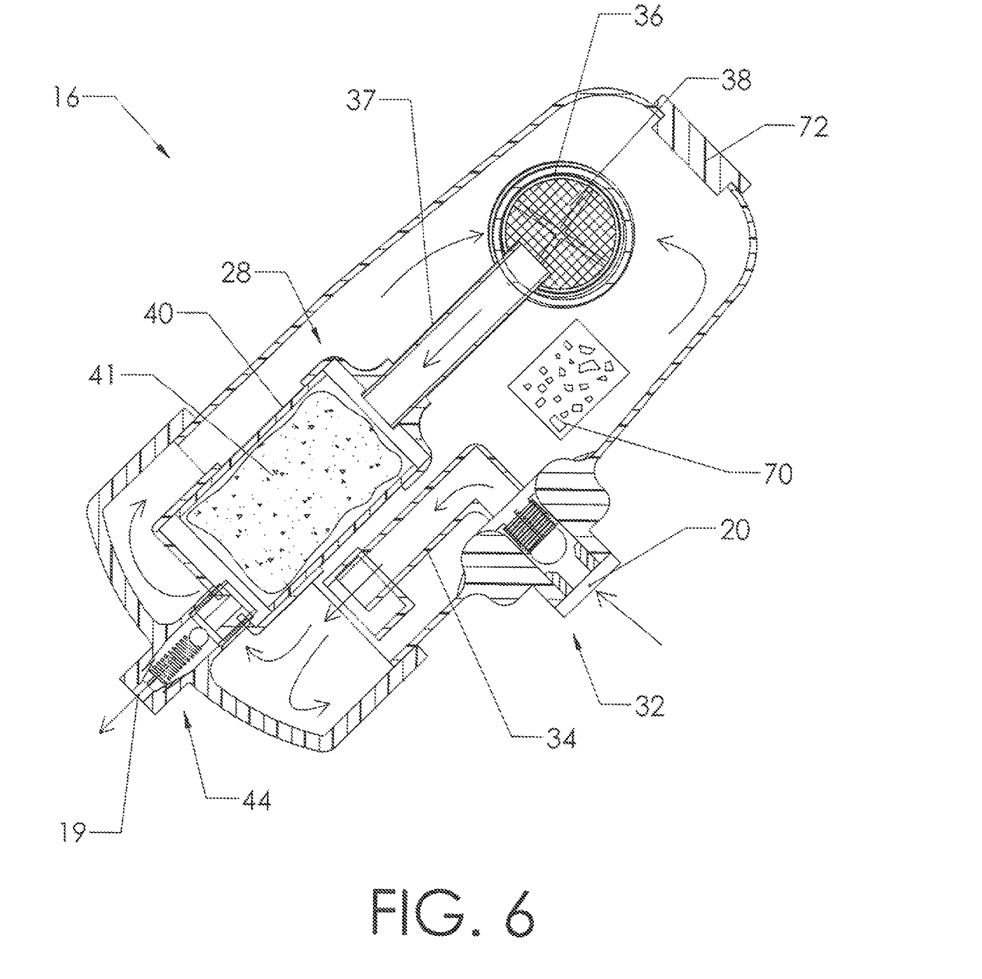
FIG. 6 is a sectional view, showing the embodiment of FIG. 2.

An exploded view of water filter 16 is shown in FIG. 4. Preferably, water filter 16 comprises three primary components—main body housing 26, water treatment module 28, and housing cap 30. Preferably, water treatment module 28 is located within main body housing 26, as illustrated in FIG. 6. Housing cap 30 preferably removably fastened to main body housing 26 in order to allow the user to remove internal components located within main body housing 26. The method of fastening can be any known in the art. However, cap 30 is preferably internally threaded while main body 26 includes threads on the outer surface of main body housing 26. Although the particular method of attachment is not important, it is preferable that housing cap 30 and main body housing 26 are distinct parts, whereby cap 30 is removable/replaceable. This allows the user to detach the two parts in order to gain access to water treatment module 28, and thereby allows the user to replace the filter media within water treatment module 28. However, some embodiments of the present invention may have cap 30 and main body housing 26 as a single part. The lifespan of the filtering media is increased due to the constantly saturated state of the filter, thereby reducing the need to change the filter as often as if the media were in a wet and dry state.

Figure 5:
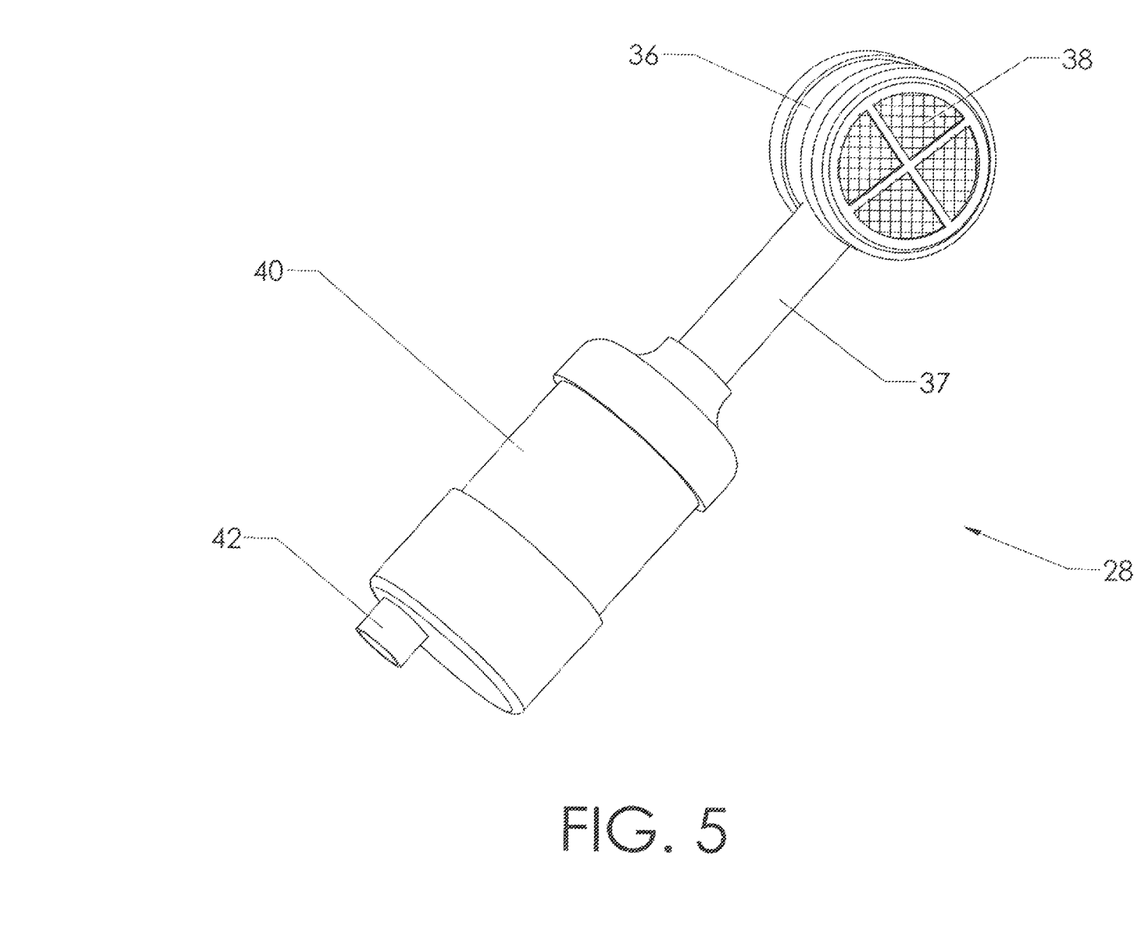
FIG. 5 is a perspective view, showing the water treatment module of the present invention.

Water treatment module 28 is shown separated from the filtering system 16 in FIG. 5. Preferably, water treatment module 28 includes expansion chamber 36, linking conduit 37, filtering media chamber 40, and water treatment outlet 42. Preferably, air expansion chamber 36 is a short, hollow cylindrical body wherein each open end includes a media exclusion screen 38. In addition, expansion chamber 36 preferably includes an opening in the side wall of the cylindrical body in order to connect to linking conduit 37, as illustrated. This connection can be a press fit, or any other known connection in the art. Air expansion chamber 36 preferably provides the necessary means to allow the filtering system to maintain an air pocket near the top edge of the filter 16. This is discussed further in the subsequent text. Once the water enters water treatment module 28 through media exclusion screen 38 it flows into filtering media chamber 40. Preferably, filtering media chamber 40 is filled with a filtering media such as kinetic degradation fluxion, or "KDF" media 41 (not visible in FIG. 5, but shown in FIG.

6). By maintaining the KDF media 41 in a wetted state, the lifetime of the KDF is greatly increased.

If the filtering media is allowed to be soaked and dried as the shower is used, the media quickly oxidizes. Oxidation of the media decreases the effectiveness and greatly reduces the lifetime of the media. However, maintaining a saturated state allows the media to maintain a high filtering effectiveness for a longer amount of time. Thus, it is preferred that filtering media chamber 40 remains in a saturated state. The method used to keep the KDF media 41 in a saturated state is discussed further in the following text.

FIG. 6 shows a sectional view of shower filter 16 in order to illustrate the internal components and water flow through the filtration system. Water enters filter 16 at filter inlet 20. The reader will note that inlet check valve 32 is located at the water filter inlet 20. This location is also where bypass valve 18 is connected (not shown in this view). Although inlet valve 32 is shown in an open state, it is a normally closed valve that opens due to the pressure of the incoming water. This is discussed further in the subsequent text. Preferably, redirection conduit 34 channels the incoming water downwards towards housing cap 30. As water enters main body housing 26, it travels upward to the volume within the housing—as demonstrated by the arrows in the figure. The reader will note that the internal volume of water treatment module 28 is separate from the internal volume of main body housing 26. Thus, water is preferably only permitted to enter water treatment module 28 through air expansion chamber 36 thereby allowing water to flow downward (as indicated by the arrow) through linking conduit 37 into filtering media chamber 40. In other words, apart from the inlet (air expansion chamber 36) of water treatment module 28, the volume of water within module 28 is separate from the volume of water in main body housing 26.

In order to undergo the second stage of filtering, water enters filtering media chamber 40. As illustrated, filtering media chamber 40 is preferably filled with KDF media 41, or a similar filtering media. Water flows through the KDF media 41, which filters the water. The amount of time the water is exposed to filtering media 41 is increased due to the construction of the filter. As water exits filtering media chamber 40, it travels through exit check valve 44 and out outlet 19. The reader will note that (1) check valve 44 is simply indicated without specific detail (this is discussed and illustrated in the subsequent text and figures) and (2) exit check valve 44 is only open when water is flowing into filter inlet 20.

In addition to KDF media 41, charcoal 70 (only a small section is illustrated in FIG. 6) is used in the filtering process within water filter 16. Only a small section of charcoal is shown in FIG. 6 for reasons of visual clarity, but preferably charcoal fills much of the interior volume of main body housing 26. Those familiar with the art will know that charcoal 70 absorbs chlorine and other organic compounds in the water. Preferably, each opening located on air expansion chamber 36 includes a media exclusion screen 38. This prevents charcoal 70 from entering water treatment module 28 as water flows into air expansion chamber 36. In a preferred embodiment of the present invention, charcoal 70 is deposited into filter 16 using removable filling cap 72. This allows the user to deposit charcoal 70 after filter 16 has been installed.

Figure 7:
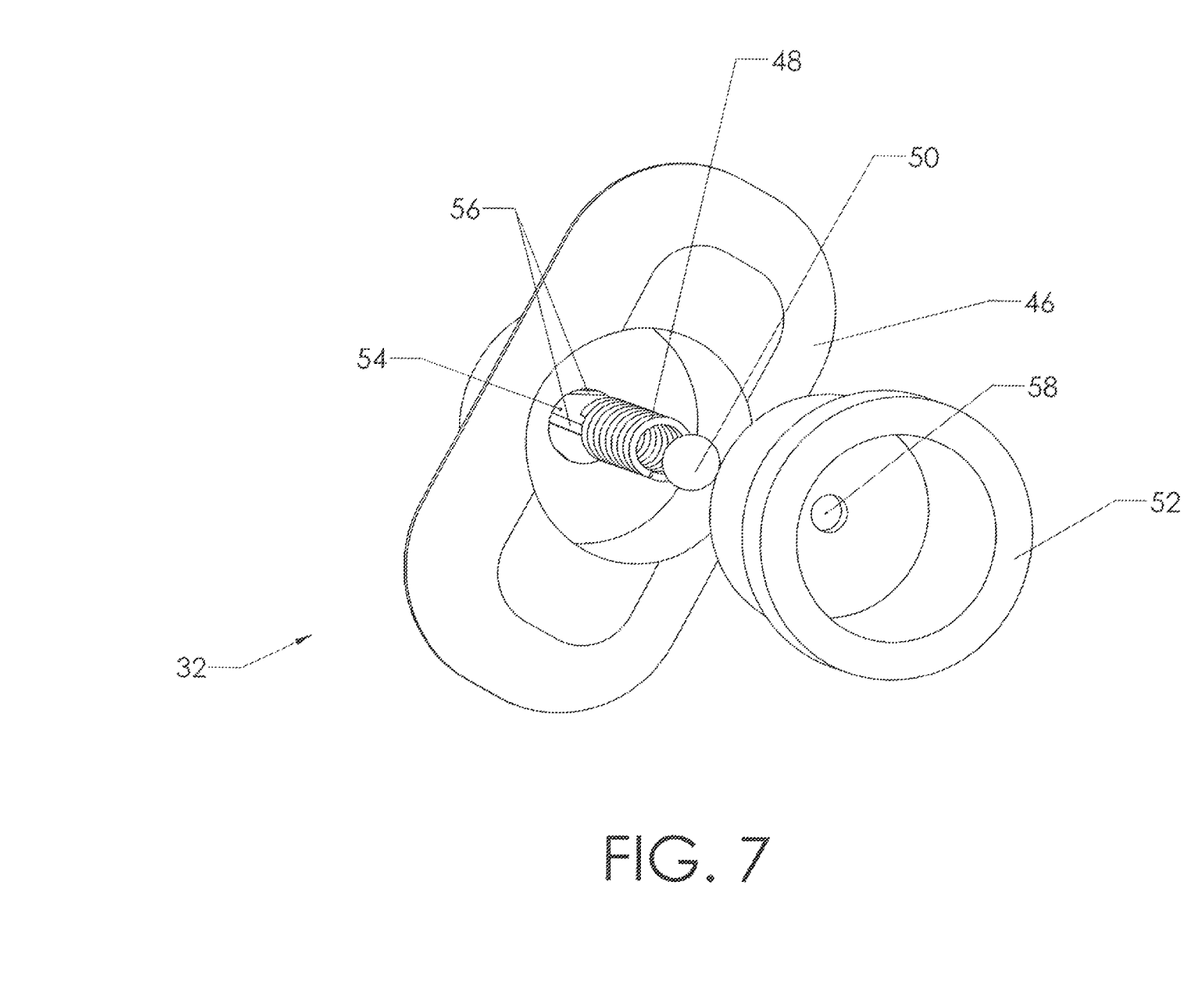
FIG. 7 is a sectional view, showing the inlet valve of the water filter.

FIG. 7 shows an exploded view of inlet check valve 32. The reader will note the location of inlet check valve 32 as indicated in FIG. 6. In this particular version, inlet check valve 32 includes filter housing mount 46, compression spring 48, ball 50, and valve cap 52. Preferably, filter housing mount 46 fastens to main body housing 26 (as indicated in FIG. 6). Also, filter housing mount 46 preferably includes central hole 54, as illustrated. Preferably, central hole 54 is designed to fit compression spring 48. Centering ribs 56 act to center spring 48 within central hole 54 and prevent spring 48 from reaching the bottom surface of central hole 54, thereby allowing water to pass by ball 50 and spring 48 when spring 48 is fully compressed. In one embodiment of the present invention, ribs 56 are designed in such a way that ball 50 and spring 48 are not capable of radial movement within hole 54. In addition, valve cap 52 preferably includes valve opening 58, which acts in accordance with ball 50 and compression spring 48 to allow and prevent water flow. In one particular embodiment, valve opening 58 includes beveled edges, which allow ball 50 to mate with valve opening 58 in a more effective manner.

Figure 8:
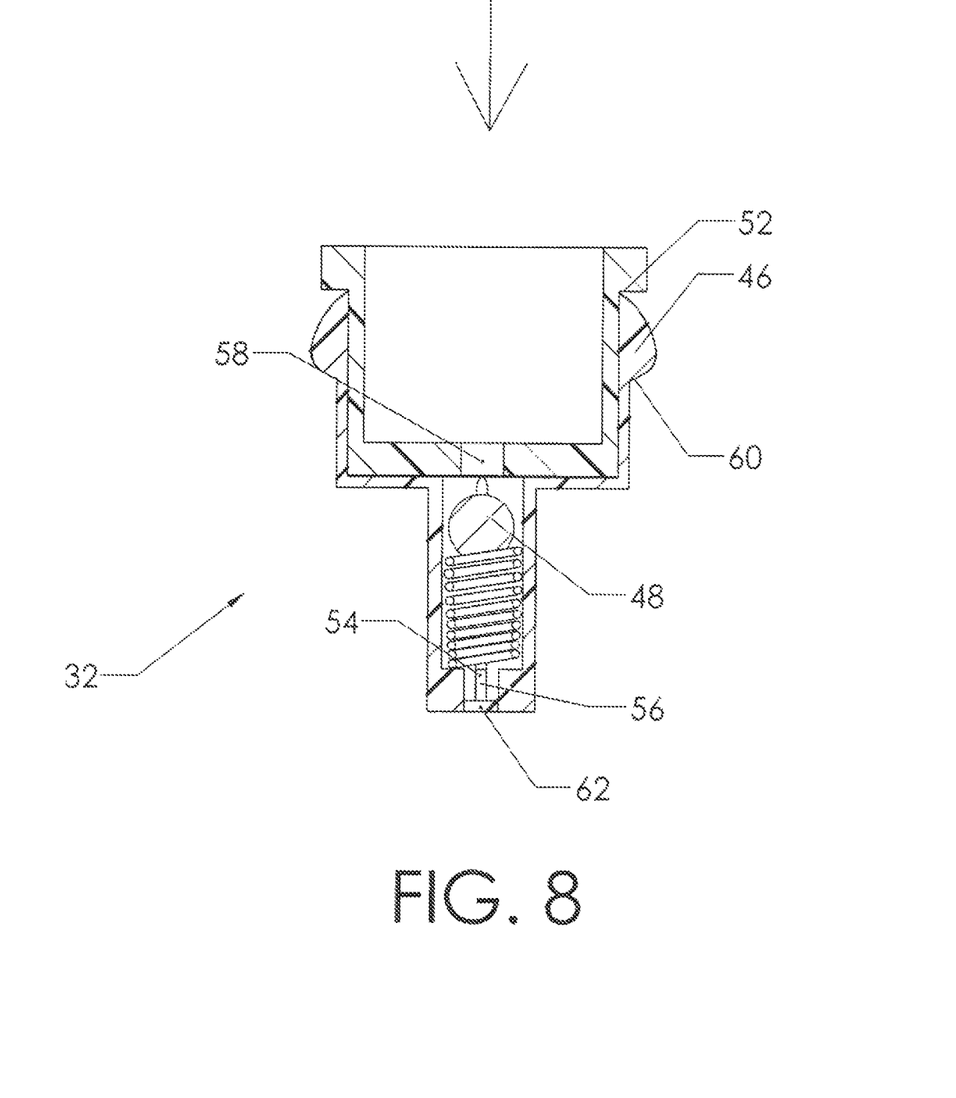
FIG. 8 is a sectional view, showing the inlet valve in an open configuration.

FIG. 8 shows a sectional view of inlet check valve 32 in an open state. As indicated by the arrow, water flows from the top of the figure to the bottom. Although not shown in the current view, bypass valve 18 and water tap 12 (water source) are located above valve cap 52 and main body housing 26 is attached to attachment surface 60. Thus, as water flows into valve cap 52 from the water source, it flows through valve opening 58 and out of opening 62 located at the bottom end of central hole 54 into the filter 16.

Figure 9:
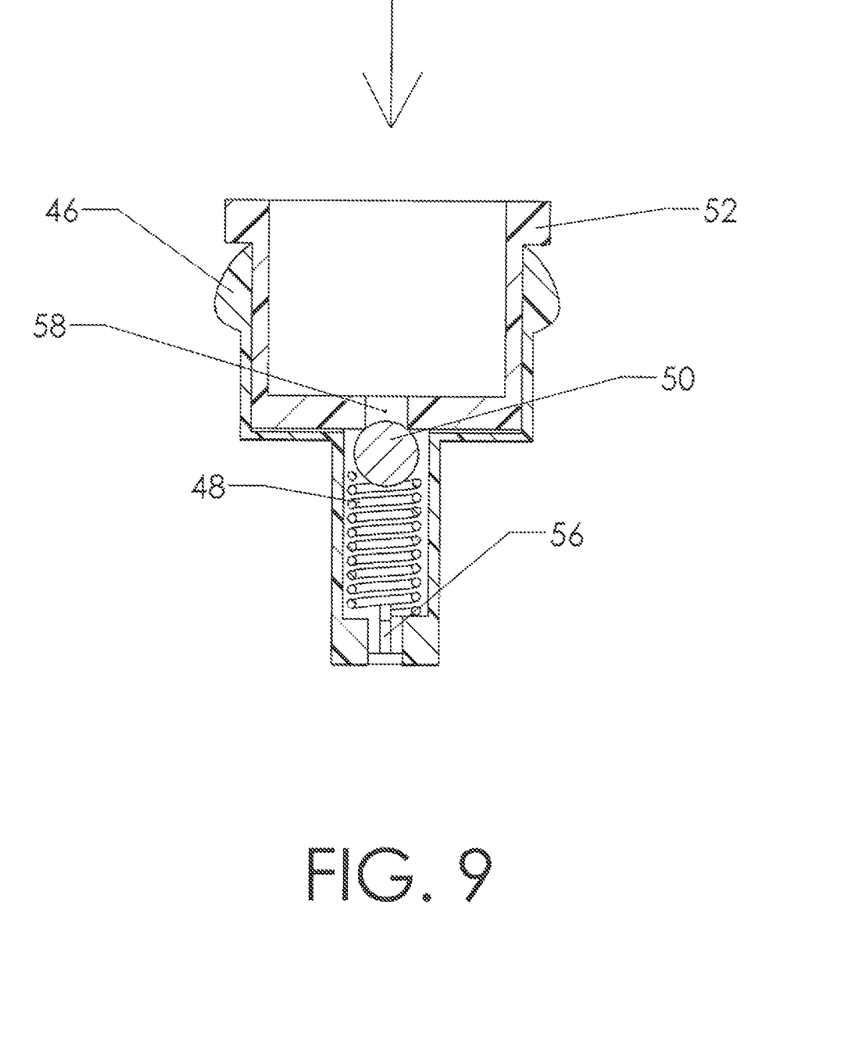
FIG. 9 is a sectional view, showing the inlet valve in a closed configuration.

In order to see the internal components and water flow of the inlet check valve 32 more clearly, FIG. 9 shows a sectional view of inlet check valve 32. FIG. 9 shows inlet valve 32 in a closed state. In the present view, water flows from the top of the view, as indicated by the arrow (as it does in FIG. 8). However, since the valve is closed in this configuration, water is not flowing from the water tap.

Now looking at FIGS. 8-9, the reader will note that prior to the user turning on the shower and water flowing from water tap 12, inlet valve will be in a closed state (FIG. 9). Since there is no water coming from tap 12, there is no force acting on ball 50 (which would be coming from the water). Thus, the only force acting on ball 50 is that of compression spring 48. This force on ball 50 acts to force ball 50 into valve opening 58 in order to create a seal. When the user activates the shower, water flows into inlet valve 32. The force created by the incoming water is greater than the force created by compression spring 48, thereby compressing spring 48 (as illustrated in FIG. 8) and forcing ball 50 from blocking valve opening 58. This allows water to flow through valve opening 58, around ball 50 and into filter 16. Then, when the user turns off the shower, the force created by the inflowing water is removed, which allows spring 48 to force ball 50 back into valve opening 58. Upon sealing valve opening 58, the water within filter 16 is prevented from escaping through valve opening 58, thereby allowing filter 16 to remain full of water.

Of course, the check valve system using ball 50 and spring 48 is one possible embodiment. This simple mechanical system is well known in the art. Thus, the reader should not take it as limiting the scope of the invention, but rather has demonstrating one possible method for carrying out the present invention. Instead of a ball and spring valve, check valve 32 could be a ball valve with an electronic sensor.

Figure 10:
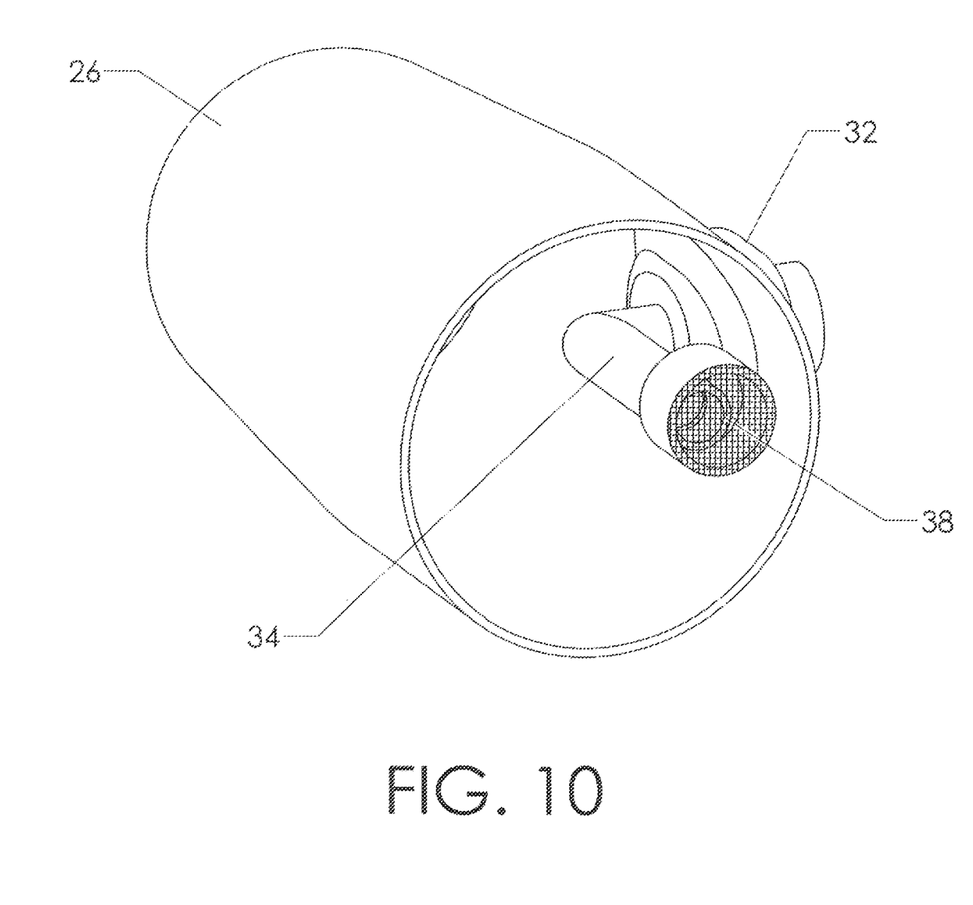
FIG. 10 is a perspective view, showing the main body housing of the present invention.

FIG. 10 shows main body housing 26 with the inlet check valve 32 assembly attached. In the current view, the reader can see that redirection conduit 34 includes media exclusion screen 38 at the exit. This prevents charcoal that is present within main body housing 26 from entering redirection conduit, and therefore inlet valve 32. Charcoal entering inlet valve 32 may cause clogging of the valve and/or reduce the amount of charcoal in the system-media exclusion screen 38 prevents this from occurring.

Figure 11:
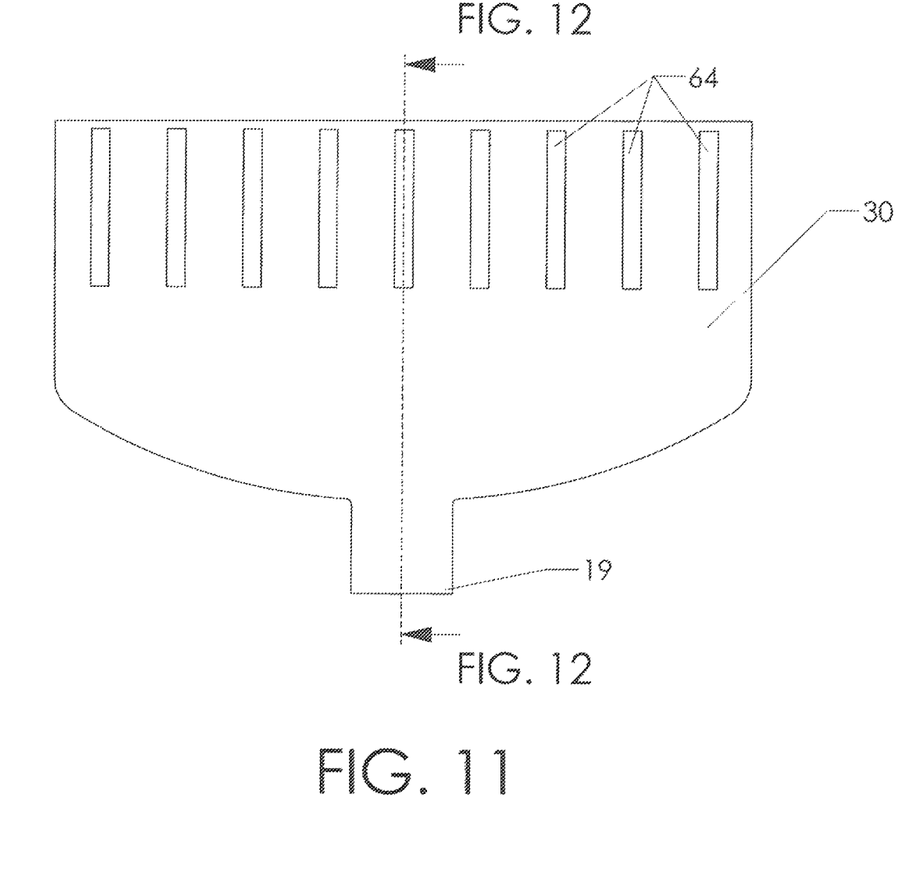
FIG. 11 is an elevation view, showing the housing cap of the present invention.

FIG. 11 shows housing cap 30 separated from the main body housing 26. Preferably, housing cap 30 includes filter outlet 19 and notches 64. Notches 64 are preferably located around the circumference of housing cap 30. Notches 64 allow for a better grip when removing (or replacing) housing cap 30 from water filter 16. A cut line is provided in the current figure which shows the sectional view of FIG. 12. The sectional view of housing cap 30 in FIG. 12 allows the user to see the internal components of outlet check valve 44. Preferably, outlet check valve 44 operates in the same manner as inlet check valve 32. When water is flowing into the filter 16, the force of the water forces ball 50 downward (in the current view) and allows water to exit the filter. While in the current view ball 50 is forced downward, in general the water forces ball 50 from blocking outlet opening 74, thereby allowing water to flow through outlet opening 74 and out of the water filter 16. When water is no longer flowing into filter 16, the force of the spring overcomes the force of the water, thereby allowing ball 50 to block outlet opening 74 and sealing the valve. Preferably, the strength of compression spring 48 is such that the force generated by spring 48 is greater than the weight of the water contained in the filter. Thus, allowing the water to remain in the filter 16 after the shower has been turned off. If the spring force is not greater than the weight of the water, then the water will leak from the filter, and the filter media will not remain in a saturated state. With these parameters, inlet check valve 32 and outlet check valve 44 keep water filter 16 full of water-even when the shower is off.

Figure 12:
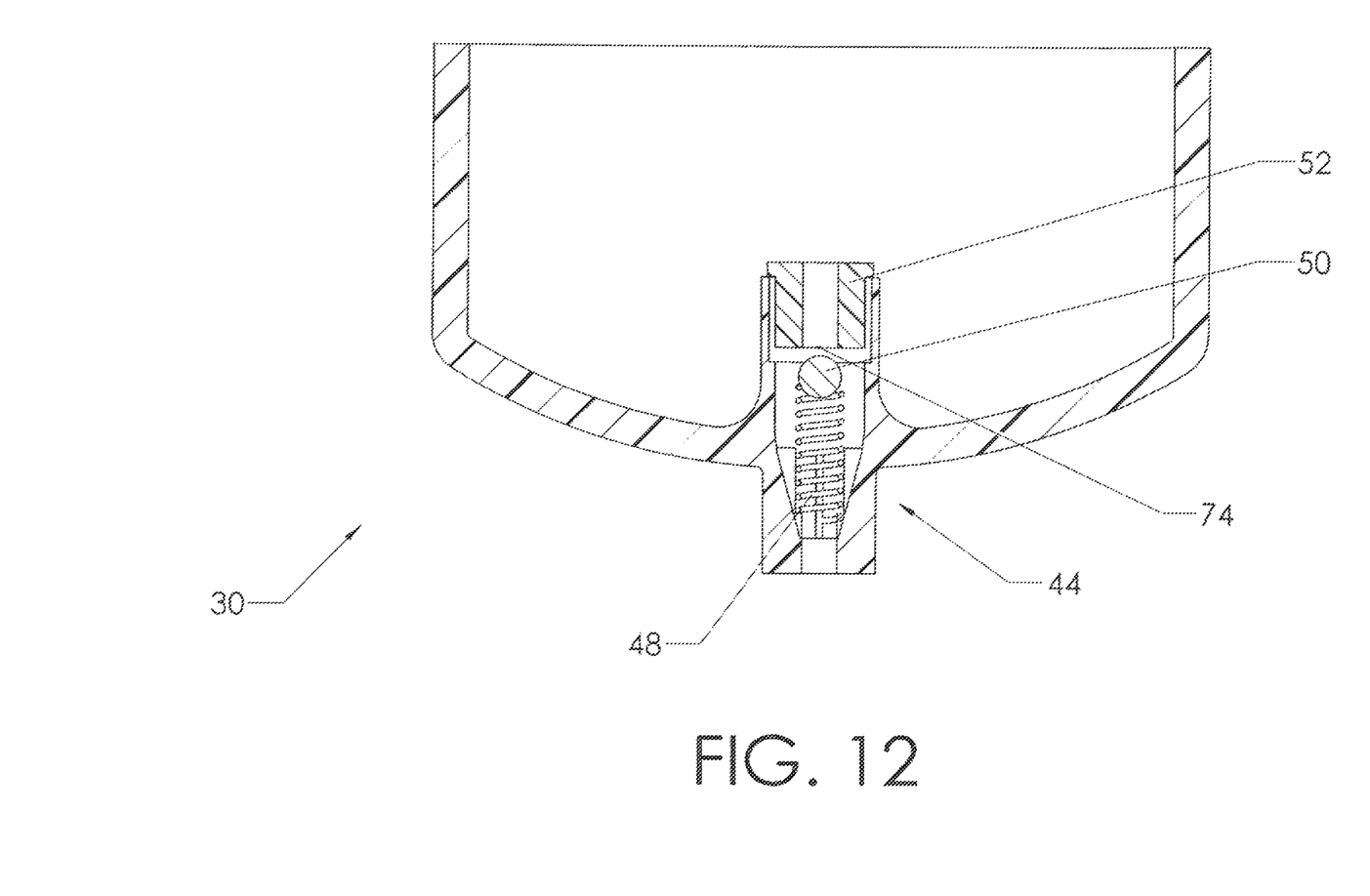
FIG. 12 is a sectional view, showing the internal components of the outlet check valve of the present invention.

Although filter outlet 19 and therefore outlet check valve 44 are shown at the bottom of filter 16, it is possible to position each component on a different location on filter 16. The positioning of outlet check valve 44 requires only that KDF 41 remain saturated. As long as this is accomplished, outlet valve 44 can be position at any location on filter 16.

Figure 13:
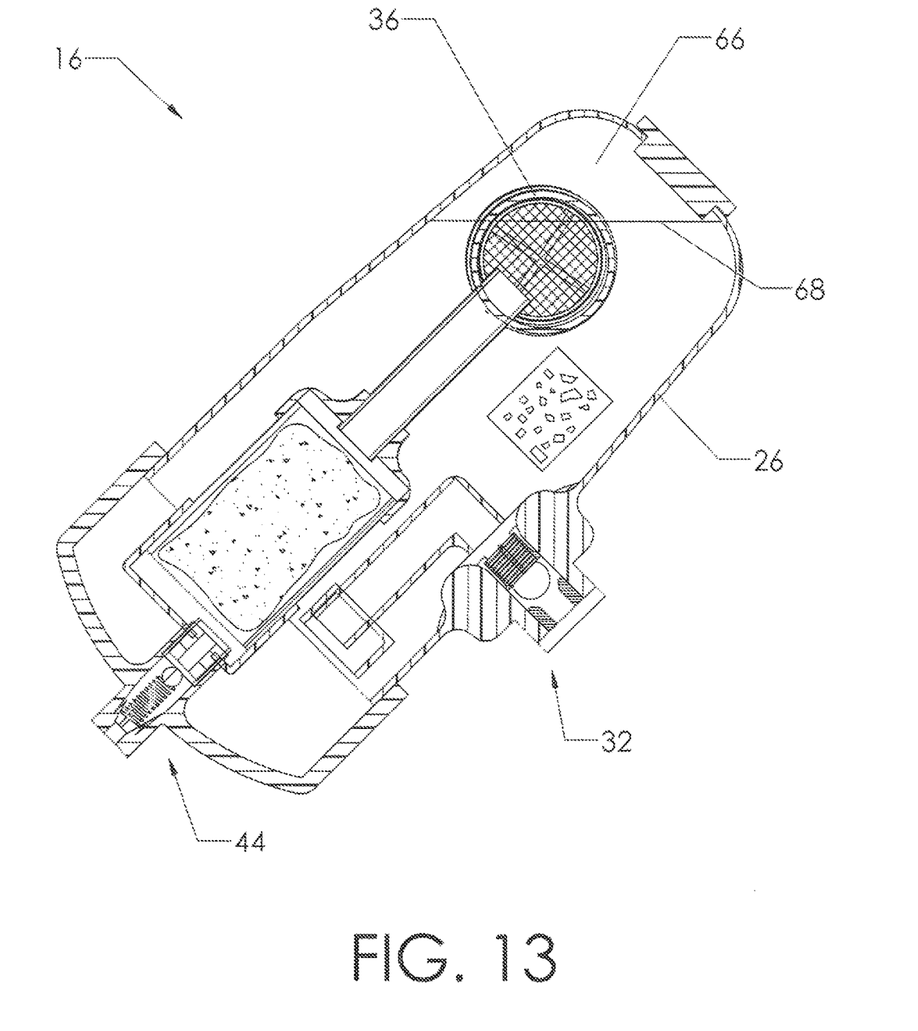
FIG. 13 is a sectional view, showing the location of an air pocket during use of the present invention.

FIG. 13 shows a sectional view of water filter 16 in the orientation customarily used when it is installed. Those familiar with the art will realize that a pressure surge, commonly referred to as "hydraulic hammer" or "water hammer" may become an issue within water filter 16. Thus, water filter 16 is designed in such a way that an air pocket 66 is created near its upper portion. Preferably, water level 68 is at such a level that in the event of a pressure surge, air pocket 66 acts as a cushion, or shock absorber. This cushion created by air pocket 66 prevents water hammer from splitting or cracking main body housing 26. The water level 68 varies depending on the flow rate of the water and whether water is flowing. The reader will note that the position of water level 68 varies, including below air expansion chamber 36. However, water will remain within filtering media chamber 40 even if water level 68 drops below expansion chamber 36, thereby maintaining the filtering media in a saturated state. As discussed previously, water filter 16 is preferably mounted at an angle between 40 and 50 degrees relative to the horizon, as illustrated. By mounting water filter 16 at about a 45 degree angle, air pocket 66 can remain in the position illustrated, which maintains the correct water level 68 within the filter 16.

Figure 14:
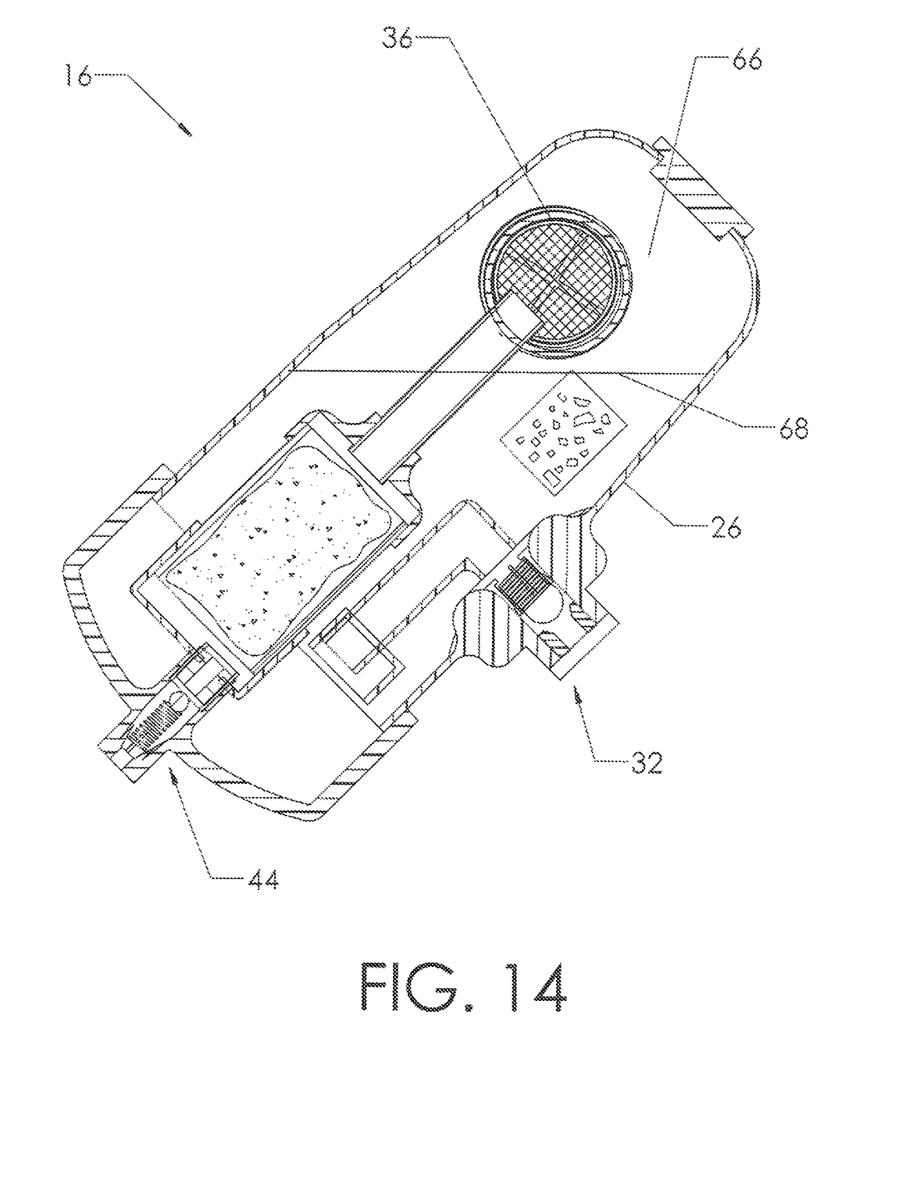
FIG. 14 is a sectional view, showing the position of the water level when water is not flowing to the filter.

FIG. 14 shows a sectional view of filtering device 16 when water is not flowing into it. The reader will note that water level 68 has moved downward when compared with FIG. 13. Because water is no longer flowing into filtering device 16, air pocket 66 expands. Those familiar with the art will realize that the decrease in water pressure is the cause for the expansion of air pocket 66, which allows the pressure to equalize within the closed system. The reader will note, however, that KDF media 41 remains in a wetted state despite the lower water level 68.

The preceding description contains significant detail regarding the novel aspects of the present invention. It should not be construed, however, as limiting the scope of the invention but rather as providing illustrations of the preferred embodiments of the invention. Thus, the scope of the invention should be fixed by the following claims, rather than by the examples given.

Having described my invention, I claim:

1. A water filter configured to be attached to a water tap in a shower in order to filter water emerging from said water tap, comprising:
   a. a hollow housing, including,
      i. a first end,
      ii. a second end,
      iii. an inlet,
      iv. a redirection conduit configured to direct a flow of said water from said inlet toward said second end of said housing, with an open end of said redirection conduit lying proximate said second end of said hollow housing,
      v. a housing cap closing said second end of said housing, said housing cap configured to redirect said flow from said redirection conduit back toward said first end of said housing,
      vi. an outlet proximate said second end of said housing,
      vii. a first check valve regulating flow through said inlet, said first check valve configured to automatically allow flow through said inlet into said hollow housing when said water tap is pressurized and to automatically prevent flow from said hollow housing to said water tap when said water tap is unpressurized,
      viii. a first type of filter media contained within said hollow housing;
   b. a filter media chamber contained within said hollow housing and located proximate said housing cap, said filter media chamber being sealed off from said hollow housing;
   c. a filter media chamber inlet within said housing, proximate said first end of said housing, and well above said outlet,
   d. a linking conduit fluidly connecting said filter media chamber inlet to said filter media chamber;
   e. a filter media chamber outlet, fluidly connecting said filter media chamber to said outlet of said hollow housing;
   f. a second type of filter media contained within said filter media chamber; and
   g. a second check valve regulating flow through said outlet in said hollow housing, said second cheek valve configured to automatically allow flow through said outlet when said water tap is pressurized and to automatically prevent flow through said outlet when said water tap is unpressurized.

2. A water filter as recited in claim 1, wherein said water filter attached to said water tap is rotatably adjustable upon said water tap.

3. A water filter as recited in claim 2, wherein said water filter is adjusted such that an air pocket is formed within said hollow housing.

4. A water filter as recited in claim 1, wherein said hollow housing is comprised of two detachable parts.

5. A water filter as recited in claim 1, wherein said check valves use a ball and a compression spring in order to allow and prevent flow from entering said hollow housing.

6. A water filter as recited in claim 1, wherein said second type of filter media is kinetic degradation fluxion media.

7. A water filter as recited in claim 1, wherein said hollow housing includes carbon particles.

8. A water filter as recited in claim 7, wherein said hollow housing inlet and said filter media chamber inlet includes a media exclusion screen.

9. A water filter as recited is claim 1, wherein a bypass valve is attached to said inlet of said hollow housing.

10. A water filter as recited in claim 1, wherein said hollow housing includes a removable cap.

11. A water filter configured to be attached to a water tap in a shower in order to filter water emerging from said water tap, comprising:
   a. a hollow housing, including,
      i. a first end,
      ii. a second end,
      iii. an inlet,
      iv. said inlet configured to direct a flow of said water from said inlet toward said second end of said housing,
      v. a housing cap closing said second end of said housing, said housing cap configured to redirect said flow from said inlet back toward said first end of said housing,
      vi. an outlet proximate said second end of said housing,
      vii. a first type of filter media configured to filter water from said water tap passing through said hollow housing;
   b. a first check valve regulating flow through said inlet, said first check valve configured to automatically allow flow through said inlet into said hollow housing when said water tap is pressurized and to automatically prevent flow when said water tap is unpressurized;
   c. a separate filter media chamber contained entirely within said hollow housing and being sealed off from said hollow housing, including,
      i. a filter media chamber inlet proximate said first end of said housing,
      ii. a filter media chamber outlet connected to said outlet of said hollow housing,
      iii. a second type of filter media contained within said filter media chamber; and
   d. a second check valve regulating flow through said outlet, said second cheek valve configured to automatically allow flow through said; outlet when said water tap is pressurized and to automatically prevent flow through said outlet when said water tap is unpressurized.

12. A water filter as recited in claim 11, wherein said water filter attached to said water tap is rotatably adjustable upon said water tap capable of creating an air pocket within said hollow housing.

13. A water filter as recited in claim 11, wherein said hollow housing is comprised of two detachable parts.

14. A water filter as recited in claim 11, wherein said check valves use a ball and a compression spring in order to allow and prevent flow from entering said hollow housing.

15. A water filter as recited in claim 11, wherein said second type of filter media is kinetic degradation flux ion media.

16. A water filter as recited in claim 11, wherein said hollow housing includes carbon particles.

17. A water filter as recited in claim 16, wherein said hollow housing inlet and said filter media chamber inlet includes a media exclusion screen.

18. A water filter as recited in claim 11, wherein a bypass valve is attached to said inlet of said hollow housing.

19. A water filter as recited in claim 11, wherein said hollow housing includes a removable cap.

\* \* \* \* \*